(12) United States Patent
Leverich

(10) Patent No.: US 11,278,828 B1
(45) Date of Patent: Mar. 22, 2022

(54) FILTRATION POURING SPOUT OR BOTTLED LIQUIDS

(71) Applicant: Andrew Leverich, Lansing, MI (US)

(72) Inventor: Andrew Leverich, Lansing, MI (US)

(*) Notice: Subject to any disclaimer, the term of this patent is extended or adjusted under 35 U.S.C. 154(b) by 5 days.

(21) Appl. No.: 17/025,221

(22) Filed: Sep. 18, 2020

(51) Int. Cl.
| | |
|---|---|
| *B01D 35/027* | (2006.01) |
| *B65D 47/12* | (2006.01) |
| *B01D 29/11* | (2006.01) |
| *B01D 35/30* | (2006.01) |
| *B65D 51/24* | (2006.01) |

(52) U.S. Cl.
CPC ........... *B01D 35/027* (2013.01); *B01D 29/11* (2013.01); *B01D 35/306* (2013.01); *B65D 47/121* (2013.01); *B65D 51/24* (2013.01)

(58) Field of Classification Search
CPC ........ B65D 25/42; B65D 25/02; B65D 47/06; B01D 35/027; B01D 29/11; B01D 35/306
See application file for complete search history.

(56) References Cited

U.S. PATENT DOCUMENTS

| | | |
|---|---|---|
| 1,428,297 A | 9/1922 | Price |
| 9,394,089 B2 * | 7/2016 | Silvers ................... B65D 47/06 |
| 2014/0144329 A1 | 5/2014 | Chiu |
| 2019/0292502 A1* | 9/2019 | Leverich ................ B01D 24/10 |

* cited by examiner

*Primary Examiner* — Waqaas Ali

(57) ABSTRACT

A filtration pouring spout for bottled liquids utilizing a diaphragm that acts as a reed valve to control the passage of liquid out of the bottle and the influx of air into the bottle.

1 Claim, 3 Drawing Sheets

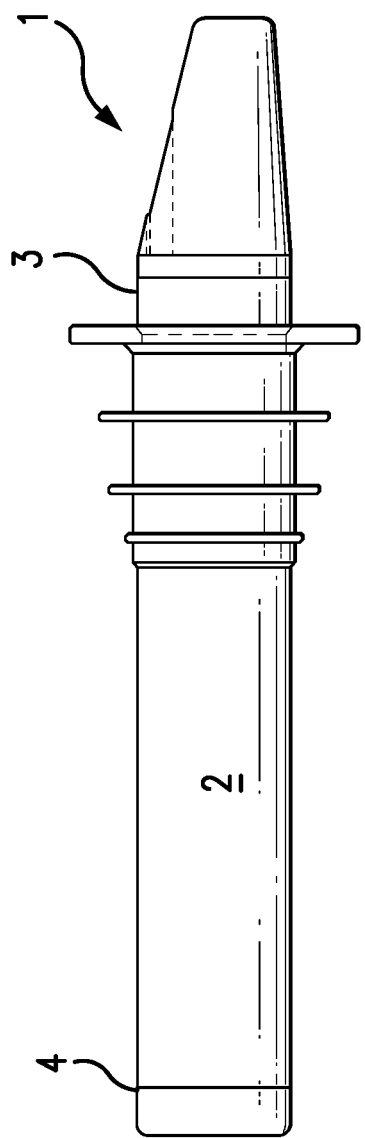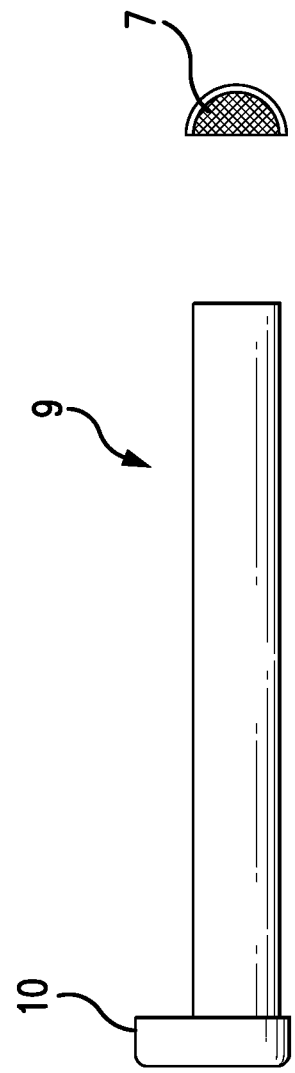

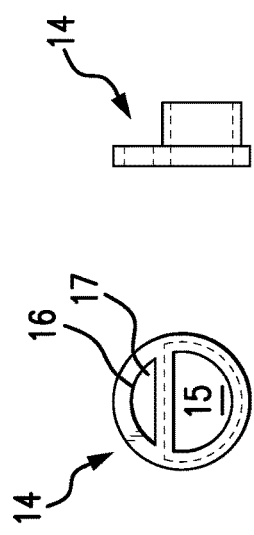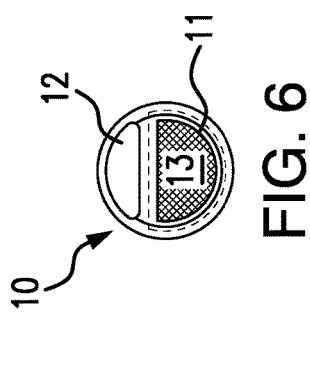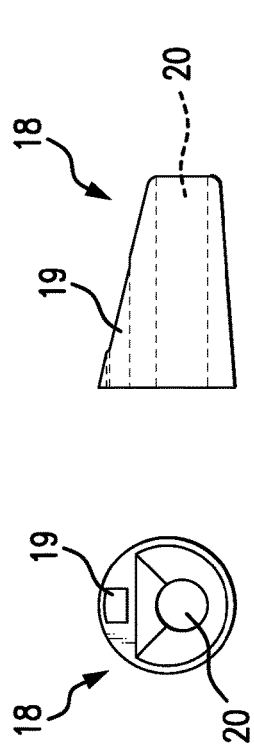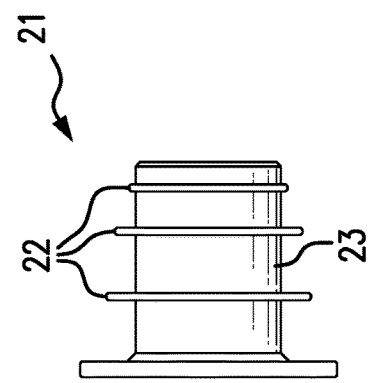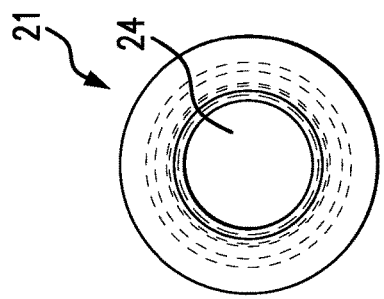

FILTRATION POURING SPOUT OR BOTTLED LIQUIDS

BACKGROUND OF THE INVENTION

Pouring devices can be found, for example, in U.S. Pat. No. 1,428,297 issued to Stephen Price on Sep. 5, 1922 in which there is disclosed a housing containing a discharge spout and a vent pipe in which the vent pipe has one end outside of the spout and one end within the container.

Another similar device can be found in Ward, that issued on May 28, 1968 wherein there is disclosed a liquid filtering device that can be surmounted on the top of bottles.

Chiu, in U.S. Patent publication 2014/0144329 on May 29, 2014 discloses a bottle-top wine decanter which has as its components, a wine-pouring tube that is filled with alkaline filter media, a breathing tube, a cap holding the wine-pouring tube, a stopper, and a magnetizer for activating wine to make the wine easy to drink.

None of these references deal with a pour spout that contains an adapter that operates as a reed valve.

THE INVENTION

Thus, what is disclosed and claimed herein is a filtration pouring spout for bottled liquids. The pouring spout comprises an elongated hollow housing coaxially surrounding a vertical axis, wherein the elongated hollow housing has a top end and a bottom end. Each end is open. The elongated hollow housing has two side-by-side open cavities, a first cavity being larger in opening than a second cavity.

There is a filter insert, the filter insert comprises an elongated hollow tube having the same length as the housing and an overall configuration to fit inside the first cavity. The filter insert has a bottom cap that is comprised of two through openings, a first through opening the same size as the first cavity and a second through opening smaller than the first through opening.

There is an adapter. The adapter is insertable in the top of the elongated hollow housing, and the adapter has two through openings, a large adapter through opening the same size as the first through opening and a smaller adapter through opening the same size as the second through opening. The smaller adapter through opening is covered with a diaphragm that acts as a reed valve.

There is a top nozzle, the top nozzle fits onto the adapter such that a side through opening in said nozzle aligns with the smaller adapter through opening. The top nozzle has a top nozzle through opening larger than the side through opening.

In a second embodiment, there is a filtration pouring spout for bottled liquids wherein the housing has a stopper encircling it that is adaptable to a top opening in a bottle.

BRIEF DESCRIPTION OF THE DRAWINGS

FIG. 1 is a full side view of a device 1 of this invention containing a stopper.

FIG. 2A is a full side view of a filter insert for the device of FIG. 1.

FIG. 2B is a top view of FIG. 2A showing the mesh screen.

FIG. 5A is a full top view of the housing of the device of FIG. 1.

FIG. 5B is a full side view of the housing of the device of FIG. 1.

FIG. 6 is a full top view of the filter insert of FIG. 2.

FIG. 7A is a full side view of the adapter of the device of FIG. 1.

FIG. 7B is a full top view of the device of FIG. 7A.

FIG. 8A is a full side view of the nozzle of the device of FIG. 1.

FIG. 8B is a full bottom view of the nozzle of FIG. 8A.

FIG. 9A is a stopper for the elongated housing of the device of this invention.

FIG. 9B is a full bottom view of the stopper of FIG. 9A.

DETAILED DESCRIPTION OF THE INVENTION

Figure 3:
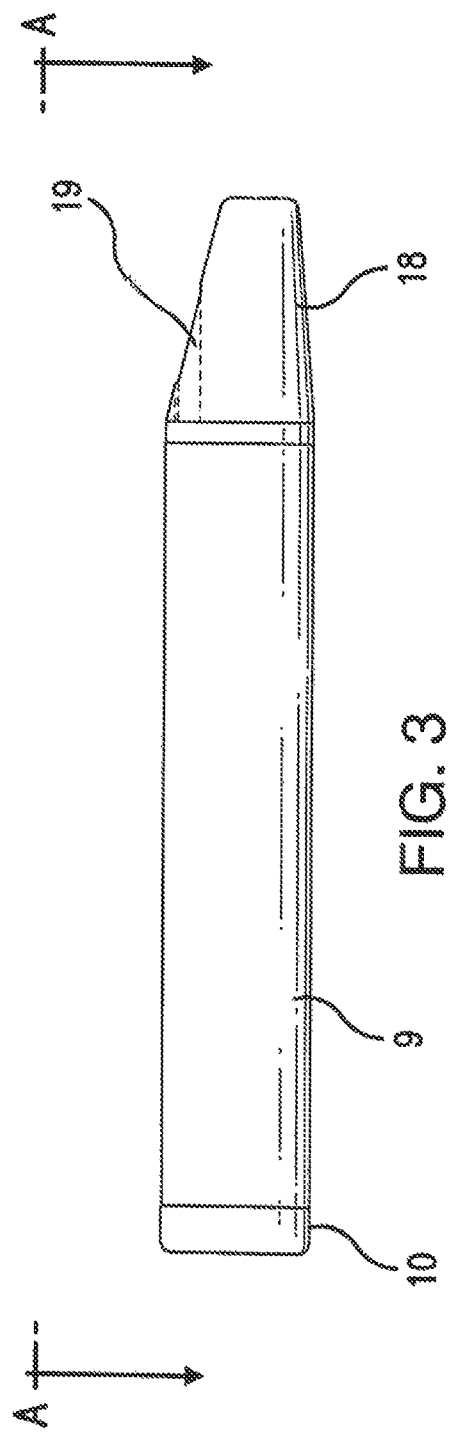
FIG. 3 is a full side view of the device of FIG. 1 without a stopper.

Turning now to the invention, there is shown in FIG. 1 a full side view of a device 1 of this invention. Shown is a housing 2, coaxially surrounding a vertical axis, said housing 2 having a top end 3 and a bottom end 4, both of which are open. The elongated hollow housing 2 has two, side-by-side open cavities 7 and 8, the full length of the housing (FIG. 5A). The first cavity 7 is larger in opening than the second cavity 8.

Figure 4:
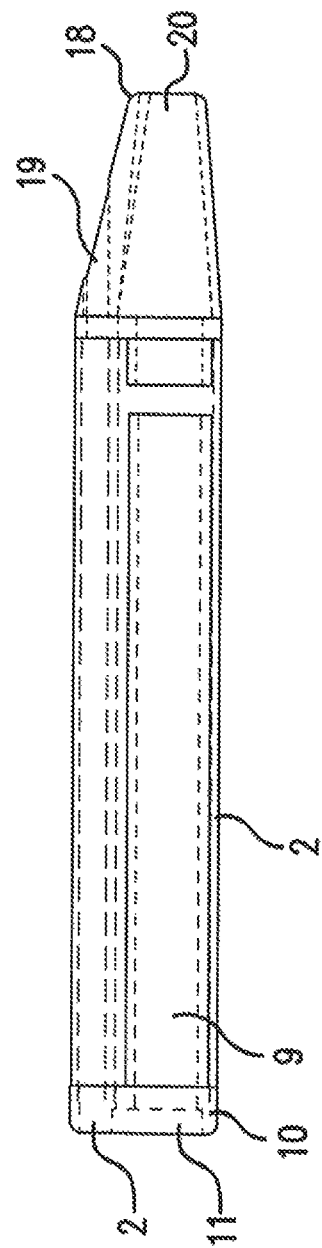
FIG. 4 is a cross-sectional view of the device of FIG. 3, through line A-A.

There is a filter insert 9 which contains a filter media such as charcoal (not shown), or the like. Filter insert 9 is shown in FIG. 2. Filter insert 9 is hollow through its length, which is the same length as the elongated hollow housing 2, and is insertable into the open cavity 7 of the hollow housing 2 (shown in phantom in FIG. 4). The filter insert 9 has a bottom cap 10 integrally fitted therewith and the bottom cap 10 has two side by side openings through it, a larger through opening 11 and a smaller through opening 12. Through opening 11 has located in it a mesh or screen 13. The top of open cavity 7 has a mesh screen in it to retain any filter media contained in it.

An adapter 14 is aligned and sits on the top end 3 of the elongated hollow housing 2. The adapter is shown in FIGS. 7A and 7B. This adapter 14 is manufactured from rubber or soft plastic and has two side-by-side openings 15 and 16. Opening 15 is the larger of the two openings, and is configured to be about the same size as the cavity 7 in the hollow housing 2. The smaller through opening 16 is designed to be about the same size as the cavity 8 of the elongated hollow housing 9. The smaller through opening 16 is fitted with a diaphragm 17 that acts as a reed valve when the device 1 is in use.

The adapter 14 is fitted with a nozzle 18, the nozzle 18 shown in FIGS. 8A and 8B. In FIG. 8B, there is shown the internal configuration of the nozzle 18, in which there is shown a small through opening 19, that aligns with the adapter through opening 16, and a larger opening 20, that aligns with the through opening 15 of the adapter 14.

In another embodiment of the invention the elongated housing 2 is fitted with a stopper 21 for use in bottles having a top opening. Such a stopper 21 is shown in FIG. 9A and a full bottom view of the stopper is shown in FIG. 9B. An opening 24 through the stopper 21 is shown in FIG. 9B. FIG. 9A shows ribs 22 that are concentric around a central core 23 of the stopper 21 to enable the stopper 21 to fit various size bottle openings. The stopper 21 is manufactured from rubber or soft plastic.

The device of this invention can be manufactured from elastomers, rubbers, plastics or light metals, such as aluminum.

What is claimed is:

1. A filtration pouring spout for bottled liquids, said pouring spout comprising: A. an elongated hollow housing coaxially surrounding a vertical axis, said elongated hollow housing having a top end and a bottom end, each said end being open, said elongated hollow housing having two side by side open cavities, a first cavity being larger in opening than a second cavity, wherein said housing has a stopper encircling it that is adaptable to a top opening in a bottle; B. a filter insert, said filter insert comprising an elongated hollow tube having the same length as said housing and an overall configuration to fit inside said first cavity, said filter insert having a bottom cap that is comprised of two through openings, a first through opening the same size as said first cavity and a second through opening smaller than said first through opening; C. an adapter, said adapter insertable in said top of said elongated hollow housing, said adapter having two through openings, a large adapter through opening the same size as said first through opening and a smaller adapter through opening the same size as said second through opening, said smaller adapter through opening being covered with a diaphragm that acts as a reed valve; D. a top nozzle, said top nozzle fitting onto said adapter such that a side through opening in said nozzle aligns with said smaller adapter through opening, said top nozzle having a top nozzle through opening larger than said side through opening.

\* \* \* \* \*